Oct. 15, 1940.   J. STOIBER   2,218,252
FOCAL PLANE SHUTTER SETTING MECHANISM
Filed Aug. 3, 1939   3 Sheets-Sheet 1
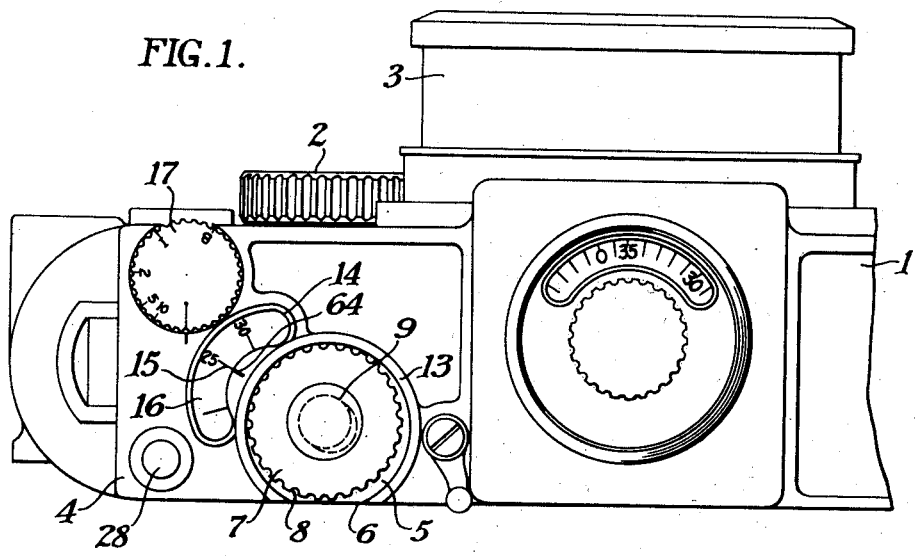
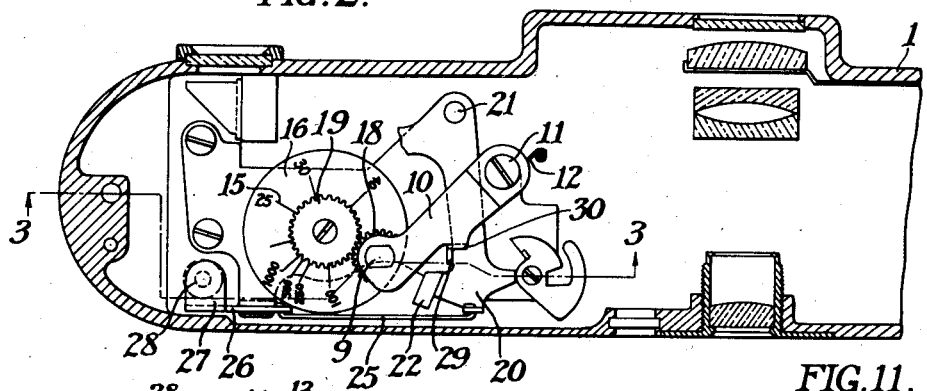
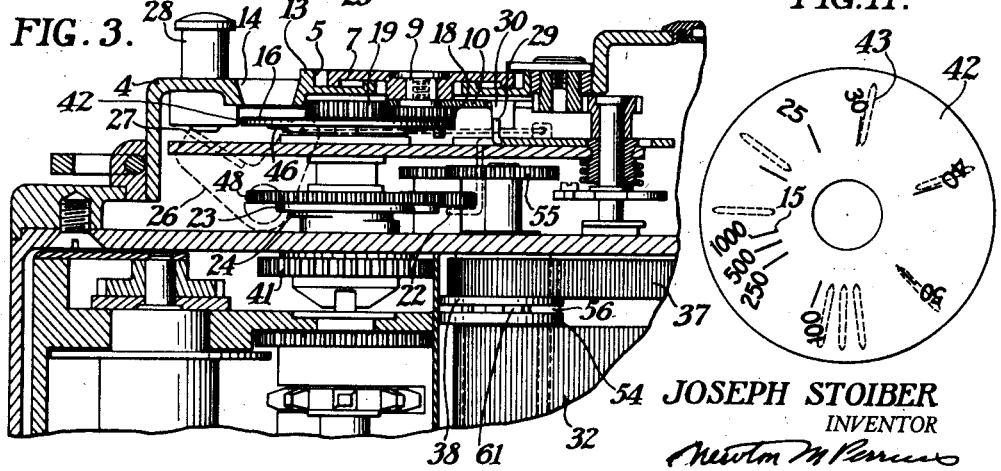
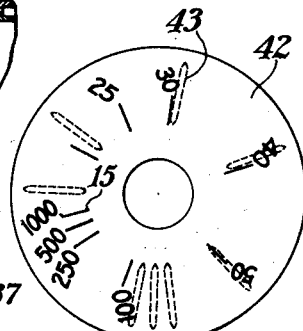
JOSEPH STOIBER
INVENTOR
BY
ATTORNEYS Oct. 15, 1940.  J. STOIBER  2,218,252

FOCAL PLANE SHUTTER SETTING MECHANISM

Filed Aug. 3, 1939    3 Sheets-Sheet 2

JOSEPH STOIBER
INVENTOR

BY
ATTORNEYS

Oct. 15, 1940.   J. STOIBER   2,218,252
FOCAL PLANE SHUTTER SETTING MECHANISM
Filed Aug. 3, 1939   3 Sheets-Sheet 3
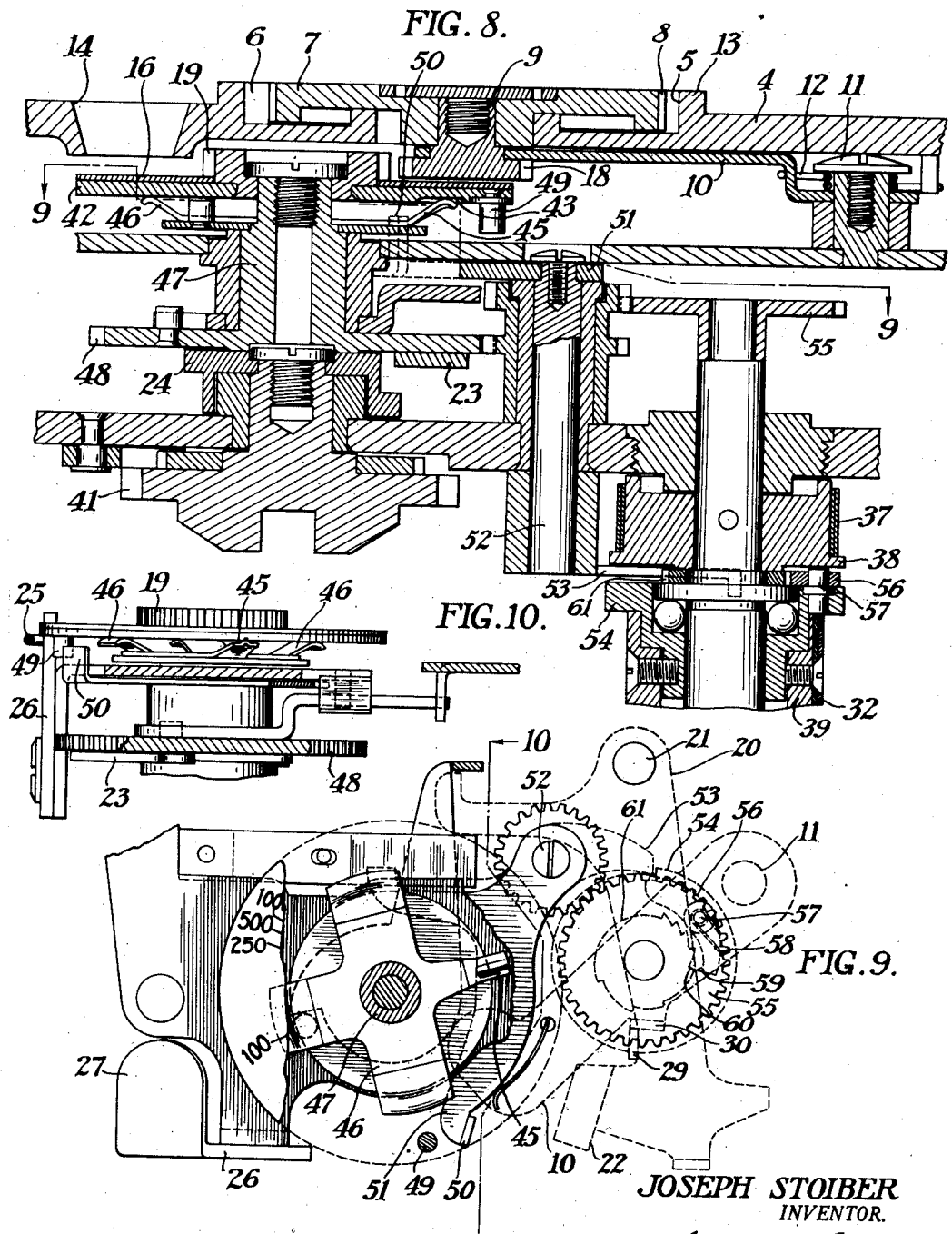
JOSEPH STOIBER
INVENTOR.
BY
ATTORNEYS.

Patented Oct. 15, 1940

2,218,252

UNITED STATES PATENT OFFICE 2,218,252

FOCAL PLANE SHUTTER SETTING MECHANISM

Joseph Stolber, Rochester, N. Y., assignor to Eastman Kodak Company, Rochester, N. Y., a corporation of New Jersey Application August 3, 1939, Serial No. 288,181

7 Claims. (Cl. 95—57)

This invention relates to photography, and particularly to a mechanism for predetermining the exposure of a focal plane shutter.

One object of my invention is to provide a curtain shutter with a pair of curtains which may be movable separately or together—separately for adjusting a slit between the curtains to predetermine an exposure, and together for making rapid exposures. Another object of my invention is to provide exterior controls on the camera for adjusting a focal plane shutter which lie in an inoperative position except when the shutter speed is being adjusted so that said controls are not moved during exposure. Still another object of my invention is to provide a setting mechanism for the focal plane shutter which may be automatically disengaged just before an exposure is made. A still further object of my invention is to provide a setting mechanism which may be temporarily latched to the shutter mechanism for the operation of setting the shutter. A still further object of my invention is to provide a means for disengaging the setting mechanism through the first part of the operation of a shutter trigger, and other object will appear from the following specification, the novel features being particularly pointed out in the claims at the end thereof.

Coming now to the drawings, wherein like reference characters denote like parts throughout:

Fig. 1 is a fragmentary part plan view of a focal plane camera equipped with my improved setting mechanism.

Fig. 2 is a view similar to Fig. 1, but with a portion of the camera shown in section.

Fig. 3 is an enlarged, transverse section through a portion of a focal plane shutter and showing, in section and part elevation, my improved form of setting mechanism.

Fig. 8 is an enlarged fragmentary sectional view through the extreme end of the curtain rollers and associated operating mechanism.

Fig. 9 is an enlarged view showing, part in section and part in elevation, a friction clutch used in connection with my setting mechanism.

Fig. 10 is an enlarged fragmentary view, partially in section, of a portion of my improved shutter setting mechanism.

Fig. 11 is a plan view of the setting dial removed from the camera.

Figure 4:
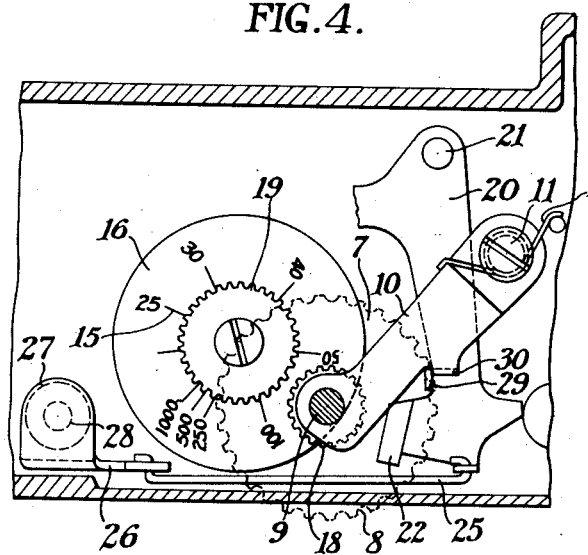
Fig. 4 is a fragmentary detail section showing parts in elevation of a portion of my shutter setting mechanism.

The present focal plane shutter is of the type in which two curtains are each provided with a power spring and controlling mechanism is employed which permits both curtains to move latched together during the exposure, and permits one curtain to move relative to the other for adjusting the end slot between the curtains which determines the fast exposures.

In most focal plane shutters, there are projecting knobs which are used to adjust one curtain relative to the other, and these knobs revolve during exposure. This is extremely undesirable because it frequently happens that the operator's hands may lie in the path of a knob and they may touch it, thus slowing up the exposure, or sometimes entirely preventing one. It is therefore desirable to provide an adjusting means on the outside of the camera, arranged to turn only when the shutter is being adjusted and to remain free from movement at all other times.

I have accomplished this by mounting the adjusting member on a movable arm so that it may be moved to and from an adjusting position.

Referring to Fig. 1, the camera body 1 may be provided with the usual focusing mechanism 2 and objective 3, and on the top wall 4, I provide a seat 5 which is recessed at 6 to movably receive an adjusting knob 7. This knob is preferably a disk having a knurled edge 8, and it is mounted upon a shaft 9 which, as best shown in Fig. 6, is carried by one arm 10 of a bell crank lever pivoted at 11 to the camera casing and being urged by a spring 12 in counter-clockwise direction.

The shape of the edge wall 13 of the dial seat 6 is such that only limited movement of the disk 7 is permitted. In the position shown in Fig. 1, the disk is in position to set the camera mechanism and this setting occurs by turning the disk 7 while watching through the window 14 until the proper speed graduation 15, carried by the setting dial 16, appears in the window. Thus, with the setting shown in Fig. 1, the camera is set for 1/25th of a second. There is also a second speed setting dial 17 which may be used for setting the shutter for slow speeds, but this need not be further described here, since it forms no part of my present invention.

Figure 6:
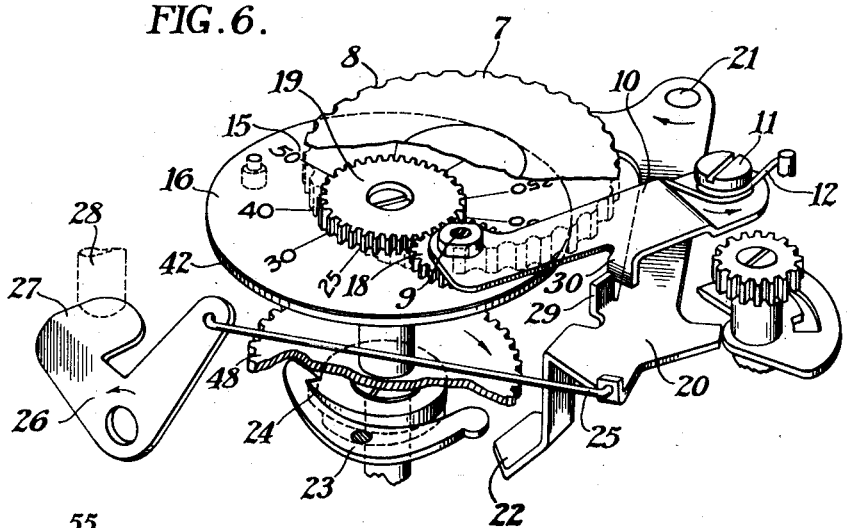
Fig. 6 is a perspective view, partially in section, showing a portion of the shutter releasing and setting mechanism.

As indicated in Fig. 6, the shaft 9 is carried by the lever 10, and the disk 7 is mounted on this shaft, which also carries a gear 18 on its lower end, this gear being positioned to swing into and out of mesh with a second gear 19 carried by the dial 16. Thus, when the lever 10 is moved in a clockwise direction with reference to Fig. 6, the gears 18 and 19 are meshed, and by turning the knurled disk 7, the setting dial 16 likewise is turned.

Since the spring 12 normally holds the lever 10 to unmesh the gears 18 and 19, it is necessary to provide a latch for holding these members in their meshed position. In the present instance, this latch consists of the release lever 20, pivoted upon a stud 21, and being provided with an arm 22 which releases the first curtain latch 23 from the cam 24, as will be hereinafter more fully described. The lever 20 is connected by a rod 25 to a bell crank lever 26, having an arm 27 lying beneath the end of and operable by the shutter trigger 28 which extends through the exterior wall of the casing.

The arm 20 has an upstanding lug 29 in the path of a downwardly extending lug 30 on the lever 10, and when the parts are positioned as shown in Fig. 6, the arm 10 will be held with the gears 18 and 19 in mesh.

Figure 5:
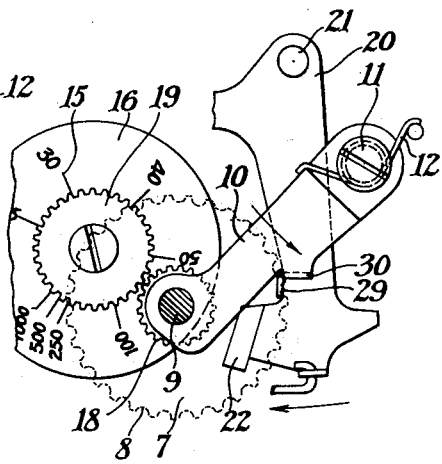
Fig. 5 is a plan view of some of the parts in a position different from that shown in Fig. 4.

However, when the trigger 28 is depressed and the bell crank lever is moved in the direction shown by the arrow, thus swinging the lever 20 in the direction shown by the arrow, the lug 29 will be swung off the end of lug 30, as indicated in Fig. 5, where the gears 18 and 19 are already shown starting to operate. This movement occurs during the first downward movement of the trigger 28 and before the latch 23 releases the cam 24. In other words, the arm 10 moves in timed relation with the trigger, so that the knurled member 7, the arm 10 and the gear 18 all move away from the setting dial 16 before movement of the dial occurs through the operation of the curtain shutters.

This is desirable for a number of reasons: First, it prevents a moving part on the exterior wall of the casing which might be interfered with by the hands of an operator. Second, it prevents the shutter from being retarded by additional members which may be of considerable weight and thus provide a certain amount of inertia which must be overcome by the shutter spring.

Figure 7:
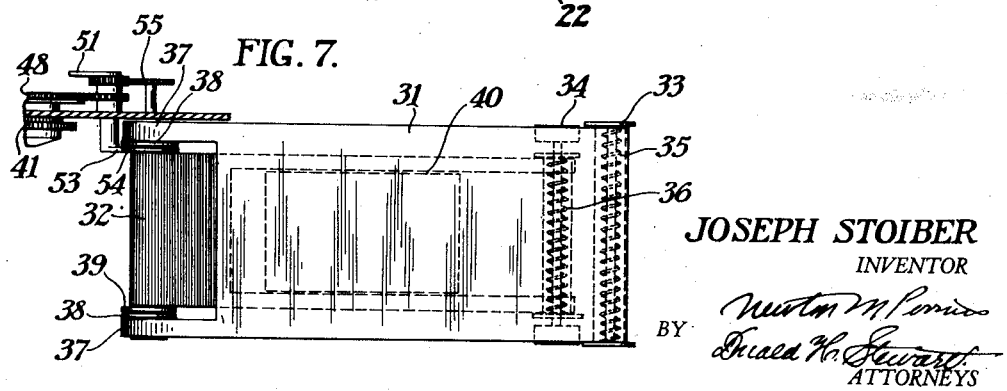
Fig. 7 is a side elevation of the two curtains and a portion of the curtain-operating mechanism.

As indicated in Fig. 7, the shutter consists primarily of two curtains 31 and 32 mounted on rollers 33 and 34, each having a spring 35 and 36 adapted to wind the curtains on the take-up rollers. I prefer to provide spring 35, which is on the roller carrying the first curtain to move, somewhat heavier than spring 36, although this is not essential. Curtain 31 carries tapes 37 engaging spools 38 which may be rotated together, and these spools may be rotated separately from the roller 39 which carries the curtain 32 for adjusting the curtains for different length automatic exposures and for permitting exposures for time or bulb.

The shutter is of the type in which curtain 31 starts to move, opens up the desired slot, and 32 then moves with it across the exposure frame indicated in Fig. 7 at 40. Such a shutter is shown in an application of Joseph Mihalyi for Curtain shutter, Serial No. 212,269, filed June 7, 1938. It is therefore unnecessary to describe, in detail, the curtain construction, but enough of it will be described herein to make the operation of my improved setting device perfectly clear.

As indicated above, curtains 31 and 32 may be separately moved for adjusting the slot. This is accomplished in the following manner: After the shutter has been wound up, which can occur by turning the gear 41 by suitable winding mechanism carried on the camera back and not here illustrated, the disk 7 can be manually pressed inwardly. This movement, as best shown in Fig. 4, causes the lever 20 to move slightly about its pivot 21 so that the downwardly extending lug 30 will snap behind the upwardly extending lug 29 and into the position shown in Fig. 6, so that the gears 18 and 19 will be held in mesh. By turning the disk 7, the dial 16 will be turned, and since the dial 16 carries a dial plate 42, this will likewise be turned. This dial plate is shown in Fig. 11 and includes a series of radial notches 43 cut in the bottom side of the plate in the same relationship as the speed graduations 44 which are attached to the dial and which move with it. These radial notches may be engaged by one spring arm 45 of a four-armed spring clutch member 46 which is carried by the shaft 47. This shaft likewise carries a gear 48 which is turned with the winding gear 41 when the shutter is being wound.

There is a downwardly extending pin 49 carried by the dial plate 42, and the position of this pin determines the duration of the exposure in the following manner: Referring to Fig. 9 the pin 49 is shown in section by being spaced from a lug 50 which is carried by an arm 51, pivoted at 52, to the casing, and including a pawl 53 which lies against a cam 54 and holds a gear 55 which turns with the first curtain 31 against turning. When the trigger 28 is depressed and the latch member 23 is moved from the cam 24, the first curtain starts to move. This movement transmits motion to the dial plate 42, and consequently moves the pin 49. When the pin 49 strikes the lug 50, it swings the pawl member 53 about pivot 52, thus accomplishing two things. First, as the pawl swings outwardly, a second pawl member 56 is permitted to swing about its pivot 57 under the impulse of its spring 58. This permits the end 59 of the pawl 56 to swing into engagement with a tooth 60 on the multi-toothed ratchet 61, thus latching the first curtain to the second curtain. At the same time, the pawl 53 releases the cam 54 so that as the second curtain 32 is latched to the first curtain 31, the second curtain is released and both springs serve to pull the two curtains across the exposure aperture 40 with the opening or slot between the two ends of the curtains determining the exposure aperture. This slot, of course, has been previously formed by the travel of pin 49 relative to the releasing lug 50.

With this shutter it is possible to get a slower speed by setting the shutter before it is rewound, and the springs 35 and 36 placed under tension. However, it is not possible to obtain a faster speed because it would necessitate moving portions of the curtain shutter mechanism against the action of holding pawls which cannot, of course, be done, and accordingly, I prefer to set the shutter only after the shutter springs have been tensioned.

From the above description, it will be seen that the shutter setting disk 7 and its associated moving parts—the arm 10, the shaft 9 and the gear 18, are all automatically moved away from the shutter mechanism in advance of its functioning because the first part of the downward movement of the trigger 28 releases the interengaging lugs 29 and 30 and permits the spring 12 to throw the arm 10 rapidly to its inoperative position. Further downward movement of the trigger causes the arm 22, through its engagement with latch 23, to initiate the shutter movement.

It will also be seen from the above description that the shutter 31 is already traveling to open up the slot at the time that the second curtain is released, at which time both curtains move together across the exposure aperture, preferably without the first curtain having stopped movement.

The operation of my improved setting device is quite simple in that an operator merely presses inwardly upon the disk 7 when he wishes to set the shutter, thus causing the lugs 29 and 30 to snap into engagement, as indicated in Fig. 6. Continued movement will turn the disk 7 and the setting movement can be continued until the proper speed graduation 44 lies opposite the engraved marker 64 adjacent the window 14.

An exposure is then made by depressing the trigger, the first part of this movement permitting the disk 7 to return to its inoperative position.

What I claim as my invention and desire to secure by Letters Patent of the United States is:

1. In a focal plane shutter for cameras including a camera casing, a pair of curtains movably mounted in the casing, and mechanism for controlling the movement of the curtains separately, the combination of a setting dial connected to the shutter mechanism, means for adjusting the width of a slot between the curtains to predetermine an exposure, and a manually operable member carried on the exterior of the casing for engaging and setting the dial, a trigger for releasing the shutter mechanism, and means for moving the manually operable member from engagement with the setting dial operable during the first part of the trigger movement.

2. In a focal plane shutter for cameras including a camera casing, a pair of curtains movably mounted in the casing, and mechanism for controlling the movement of the curtains separately, the combination of a setting dial connected to the shutter mechanism, means for adjusting the width of a slot between the curtains to predetermine an exposure, a friction clutch between the setting dial and the means for adjusting the exposure, and a manually operable member carried on the exterior of the casing for engaging and setting the dial against friction of said friction clutch, a trigger for releasing the shutter mechanism, and means for moving the manually operable member from engagement with the setting dial operable during the first part of the trigger movement.

3. In a focal plane shutter for cameras including a camera casing, a pair of curtains movably mounted in the casing, and mechanism for controlling the movement of the curtains separately, the combination of a setting dial connected to the shutter mechanism, means for adjusting the width of a slot between the curtains to predetermine an exposure comprising a bell crank lever, a gear carried by the dial, a gear carried by the bell crank lever, a knurled setting member carried by the bell crank lever to turn the gear carried thereby, a movable shutter trigger and means operable upon the first part of the trigger movement for disengaging the dial and bell crank lever gears.

4. In a focal plane shutter for cameras including a camera casing, a pair of curtains movably mounted in the casing, and mechanism for controlling the movement of the curtains separately, the combination of a setting dial connected to the shutter mechanism, means for adjusting the width of a slot between the curtains to predtermine an exposure, a movable trigger for releasing the shutter, said means for adjusting the curtains to predetermine an exposure including a gear on the setting dial, a manually operable disk outside of the camera, a pivoted arm carrying said disk and a gear connected to the disk movable to mesh and unmesh the gears, means normally unmeshing the gears and a latch operable with the trigger for holding the gears in mesh.

5. In a focal plane shutter for cameras including a camera casing, a pair of curtains movably mounted in the casing, and mechanism for controlling the movement of the curtains separately, the combination of a setting dial connected to the shutter mechanism, means for adjusting the width of a slot between the curtains to predetermine an exposure, a movable trigger for releasing the shutter, said means for adjusting the curtains to predetermine an exposure including a gear on the setting dial, a manually operable disk outside of the camera, a pivoted arm carrying said disk and a gear connected to the disk movable to mesh and unmesh the gears, a friction clutch between the dial gear and the shutter mechanism, means normally separating said disk gear and said dial gear, a latch operable by the trigger for holding the gears in mesh whereby manual movement of the disk may turn the dial on its friction clutch to predetermine an exposure.

6. In a focal plane shutter for cameras including a camera casing, a pair of curtains movably mounted in the casing, and mechanism for controlling the movement of the curtains separately, the combination of a setting dial connected to the shutter mechanism, means for adjusting the width of a slot between the curtains to predetermine an exposure, a movable trigger for releasing the shutter, said means for adjusting the curtains to predetermine an exposure including a gear on the setting dial, a manually operable disk outside of the camera, a pivoted arm carrying said disk and a gear connected to the disk movable to mesh and unmesh the gears, a friction clutch between the dial gear and the shutter mechanism, means normally separating said disk gear and said dial gear, a latch operable by the trigger for holding the gears in mesh, a seat for the manually operable member for setting the dial on the exterior of the camera shaped to permit only limited movement of the manually operable member for meshing and unmeshing the gears, said latch being releasable by the trigger, whereby movement of the trigger may immediately unmesh the gears before said shutter curtains are released for making an exposure.

7. In a focal plane shutter adjusting means for cameras, the combination of a camera body, with a shutter comprising a pair of curtains, mechanism for controlling the movement of said curtains separately and together including a latch for each curtain, a spring for each curtain, a trigger for tripping one latch, an adjustable pin for tripping the second latch, means for setting the adjustable pin from the exterior of the camera including a disk, a movable mount therefor and means carried thereby adapted to engage and move a setting dial, said adjustable pin being movable with the setting dial, and a latch operable by the shutter trigger for holding the setting dial moving means in operable contact therewith, and a spring for moving said parts out of contact as the trigger is depressed.

JOSEPH STOIBER.